United States Patent [19]

De Mets

[11] 3,942,929

[45] Mar. 9, 1976

[54] CONTINUOUSLY OPERATING PRESS

[75] Inventor: Albert De Mets, Izegem, Belgium

[73] Assignee: Bison-Werke Bahre & Greten GmbH & Co. KG, Germany

[22] Filed: Mar. 31, 1975

[21] Appl. No.: 563,398

Related U.S. Application Data

[62] Division of Ser. No. 339,039, March 8, 1973, Pat. No. 3,887,318.

[30] Foreign Application Priority Data

| | | |
|---|---|---|
| Mar. 8, 1972 | Germany | 2211191 |
| Apr. 24, 1972 | Germany | 2220074 |

[52] U.S. Cl. ................ 425/143; 100/153; 425/224; 425/335; 425/371

[51] Int. Cl.$^{2}$ ........................ B29C 3/06; B29C 15/00

[58] Field of Search ........... 425/143, 371, 329, 335, 425/224, 223; 100/151, 154, 153; 264/109, 165

[56] References Cited

UNITED STATES PATENTS

| | | | |
|---|---|---|---|
| 2,289,250 | 7/1942 | Denning | 264/109 |
| 2,627,291 | 2/1953 | Smith et al. | 144/281 |
| 2,742,951 | 4/1956 | Marc | 425/371 X |
| 2,784,763 | 3/1957 | Shorts | 425/143 X |
| 2,926,104 | 2/1960 | Goetz | 425/224 X |
| 2,928,124 | 3/1960 | Hugger | 425/335 X |
| 2,967,329 | 1/1961 | Friedland et al. | 425/430 X |
| 2,975,470 | 3/1961 | Snelson et al. | 425/329 X |
| 3,065,500 | 11/1962 | Berner | 425/329 X |
| 3,325,859 | 6/1967 | Goldstein | 425/371 X |
| 3,545,370 | 12/1970 | Coughey | 425/115 X |

*Primary Examiner*—Robert L. Spicer, Jr.
*Attorney, Agent, or Firm*—Craig & Antonelli

[57] ABSTRACT

A continuously operating press utilizing facing endless belts for compressing chip material into chipboards, fibreboards and the like. Each of the belts is constructed as an endless belt formed of a plurality of heatable planar chain links. For conveying and directly engaging the chip material, corresponding endless steel bands envelope the chain belts. Gas flame burners are arranged in casings for directly heating a portion of the chain run at a position spaced from the engagement with the chip material. Each of the casings also include burner exhaust gas conducting channels for conducting the hot exhaust gases adjacent portions of the chain which are not impinged upon by the flame at a particular given time. Also, conduit means for the flame burner exhaust gases are provided for conducting the exhaust gases to heat the endless steel bands by way of Z-shaped channeled housings arranged at a position spaced from the casings for the flame burners and immediately adjacent the steel bands.

13 Claims, 10 Drawing Figures

CONTINUOUSLY OPERATING PRESS

This is a division of application Ser. No. 339,039, filed Mar. 8, 1973, now U.S. Pat. No. 3,887,318.

BACKGROUND AND SUMMARY OF THE INVENTION

The invention relates to a continuously operating press for producing boards such as chipboards, fibreboards or the like with two superimposed endless belts comprising heatable plates articulated to one another and rotating about horizontal and parallel shafts whose facing sides are movable in the same direction particularly by drivable feed rollers and each endless belt is enveloped by a further heatable endless steel band. Presses of this general type are known (U.S. Pat. Nos. 2,926,719, 2,981,307).

In order to adequately heat the heatable plates and the associated endless steel bands covering these plates, hitherto electrically or steam-heated plates were used which were in contact with the plates of the endless belts to be heated or with the steel bands to be heated. This heating to an adequate temperature of the steel bands and plates with electric power or steam is relatively expensive, even though heating with steam is cheaper than heating with electric power.

The present invention contemplates a more economic manner of heating of the endless belts and steel bands than was hitherto possible. The present invention also contemplates to permit heating in a relatively rapid manner to advantageously above 200°C, as well as to increase the throughput of the continuously operating presses.

To solve the above-discussed problems of the prior art, it is proposed according to a preferred embodiment of the invention to provide both the upper run of the upper endless belt and the lower run of the lower endless belt each with at least one casing provided with at least one suction pipe, wherein are arranged a plurality of flame burners. These flame burners are gas burners, each of which directly heats a portion of the run of the belt, the waste or exhaust gases from the burners being led away in such a way that these gases impinge upon the endless belt also outside the area directly heated by the gas burners. Heating the areas to be heated by gas in this way is not only much cheaper than electrical or steam heating but is also more effective because the waste or exhaust gas obtained is also used for heating the areas to be heated and namely in areas which are located in front of or behind the flame burners. In addition by the conduction of the exhaust gas in the casing a good insulation of the endless belts against cooling is obtained.

In a preferred form of the invention, each gas burner comprises a chamber provided at the top with slots and surrounded by a cooling jacket wherein is arranged a supply pipe with a plurality of openings for a gas -- air mixture. Such cooling air chamber construction associated with the individual gas burners limits or prevents the danger that the burners would be extinguished at the relatively high temperatures of about 600°C. The gas burners preferably are located parallel to one another and extend transverse to the direction of movement of the endless belts. If, for reasons of space, the casing cannot be designed so that it envelops part of the endless belt so that in practice the casing is covered by the endless belt from above, than an adequate utilization of the exhaust gas heat is still achieved although part of the waste gases are led away below the parallel gas burners.

Preferably, however the casing should be designed in such a way that it envelops at least a part of an endless belt and the part of the latter is constructed as a partition optionally with associated sealing means. In this case the corresponding endless belt is acted upon and thereby heated from one side by both the flames of the gas burners and the waste gases removed and on the other side is heated by the waste gases removed. In this last-mentioned arrangement it is preferred that the walls of the casing be arranged spacedly from the portion of the endless belt and to provide sealing means between the side walls of the casing and the portion of the belt which extend to just before the terminal surfaces of the casing, the suction pipe being arranged in immediate proximity of the upper side of the casing. As a result of this construction of the casing, the length of the casing can be made much larger than the width of the endless belt area upon which the gas burners act when viewed in the direction of movement of the belt. After igniting the gas burner the burner exhaust gases heat the belt at points upon which the gas flames have not yet impinged and the portion already heated by the burner flame is further heated by contacting the belt behind the gas burners so that the heat output of the burners is fully used.

To obtain a uniform selectable temperature in the members of the endless belt, the present invention further contemplates that the temperature of the heated plates be measured and the result of the measurements be used via a limit value circuit for switching on and off the burner or burners. In a preferred construction, behind the outlet point of the casing nearest to a deflecting or reversing pulley for a respective endless belt, a contact plate is provided which is pivotally mounted about a horizontal axis and is displaceable perpendicular to the plane of the plate. This contact plate has at least one heat sensor which is connected to a thermometer. Upon reaching a selectable or predetermined temperature in the contact plate, some of the burners, and on reaching a still higher predetermined temperature, further or all of the burners, are disconnected or shut down. Also, on reduction of the detected temperature in the contact plate, part or all of the burners are connected up again. It is preferred to provide at least two burners in each casing to facilitate the above-discussed temperature control and optimize heating.

Since the endless steel bands surrounding the endless belts are also heated by the waste gases from the gas burner, uniform temperatures over the bands are readily obtainable.

It is further proposed by the present invention that, below the upper run of the lower endless steel band, a housing is provided which forms a plurality of zig-zag channels and has partitions to which can be supplied the exhaust gases of the flame burner or burners heating one of the endless belts. This particular arrangement results in a very economical heating of the lower endless steel band, even though the length of this lower band is considerably greater than the upper endless belt to accommodate a material conveying function.

A more uniform temperature of the upper run of the lower endless steel band can be obtained according to the present invention by providing that the waste gas supply connections discharge into the partial chambers of the housing associated with the endless steel band which is located nearest to the enveloped endless belt. Although each partition arranged in the housing can be provided at one of its ends with openings such as holes or slots, it is preferred that the length of each partition be made smaller than the width of the casing because thereby a saving in material and construction time is obtained. In both cases it preferably should be ensured that the waste gases are led through the partial chambers in a zig-zag manner.

These and further objects, features and advantages of the present invention will become more apparent from the following description when taken in connection with the accompanying drawings which show, for purposes of illustration only, several embodiments in accordance with the present invention.

DETAILED DESCRIPTION OF THE DRAWINGS

Figure 1:
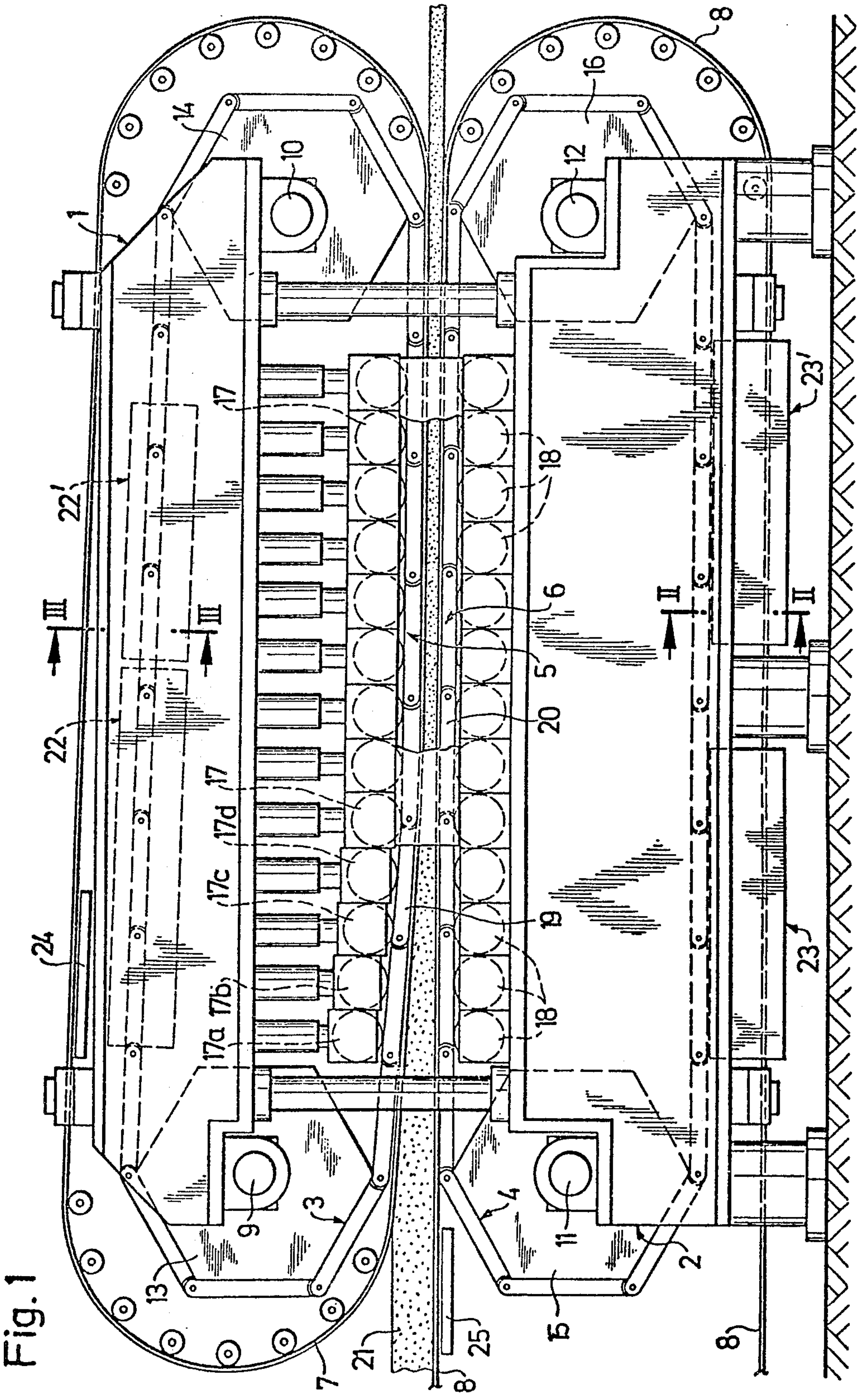
FIG. 1 is a schematic side view of a continuously operating press for producing fibreboards and/or chipboards whose endless belts are each provided with two casings having flame burners or the like in accordance with the present invention.

The continuously operating press shown comprises two frames 1 and 2, from each of which an endless plate chain 3 and 4 is arranged in such a way that the facing chain runs 5 and 6 of said plate chains form a gap therebetween which serves to shape a stream of chips 21. These plate chains 3 and 4 are each enveloped by a further respective endless band 7 or 8. These bands 7 and 8 are interposed between the plate chains and the supply of chips 21 so as to directly compress the chips. Endless band 8 also serves as a supply conveyor belt to supply the stream of chip material to be compressed. The second left-hand guide roller or drum or the like provided for deflecting the endless band 8 is not shown in the drawing. To deflect or reverse plate chains 3 and 4, use is made of respective deflection pulleys 13 and 14 or 15 and 16 having a polyangular outer contour and which are freely rotatable about shafts 9 and 10 or 11 and 12 which are horizontal and parallel to one another. Driving means, not shown but of known construction, are used to appropriately drive said chains and bands.

The facing chain runs 5 and 6 are influenced by feed rollers 17 insofar as they are associated with the upper plate chain 3. Corresponding feed rollers 18 are associated with the lower plate chain 4 which rollers 18 face the upper feed rollers 17. Feed rollers 17*a* to 17*d* are influenced by hydraulic means in such a way that they bring about a compression of the chip material sheet supplied. The pressure on these rollers 17*a* to 17*d* exerted is resilient and adjustable for appropriately sequentially compressing the chips. Feed rollers 18 arranged below feed rollers 17, 17*a* to 17*d* are fixedly mounted. The diameters of the feed rollers shown are such that at all times at least two adjacent feed rollers are in working connection with one chain plate 19 or 20; i.e. the length of each chain plate 19 or 20 is at least equal to double the axial spacing of respective adjacent feed rollers 17 or 18.

The runs or travel path of plate chains 3 and 4 remote from the chip material sheet 21 to be compressed are heated by gas burners, to be described hereinafter, arranged in respective casings 22 and 22' and/or 23 and 23'. In addition, the endless steel bands 7 and 8 enveloping plate chains 3 and 4 are also heated by the waste gases of the gas burners as explained below. These bands may also be heated by electrically heated heating plates 24 and 25 which give off their heat by contact.

Figure 2:
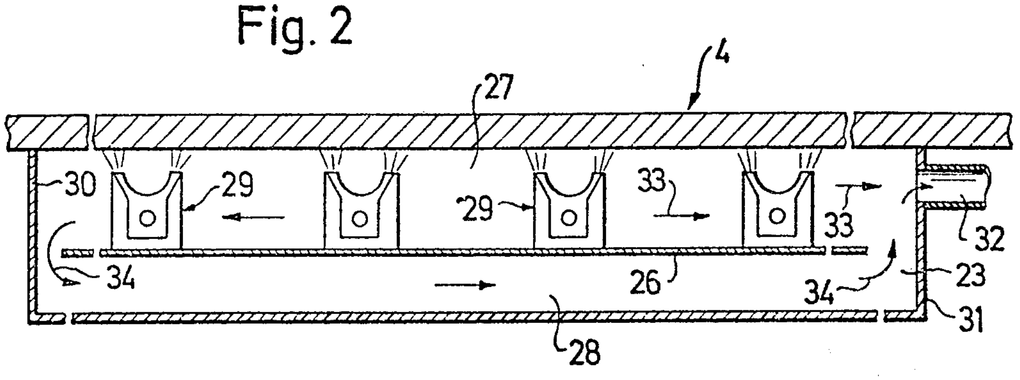
FIG. 2 is a cross-section along the line II—II of FIG. 1.

Casing 23' shown schematically in FIG. 2 and associated with the lower run of the lower plate chain 4 is divided by partition 26 into two superimposed separate chambers 27 and 28. In the upper chamber 27 are arranged four gas burners 29 extending parallel to one another and transverse to the direction of movement of plate chain 4 so that their flames pass over the complete width of the chain plate.

Figure 3:
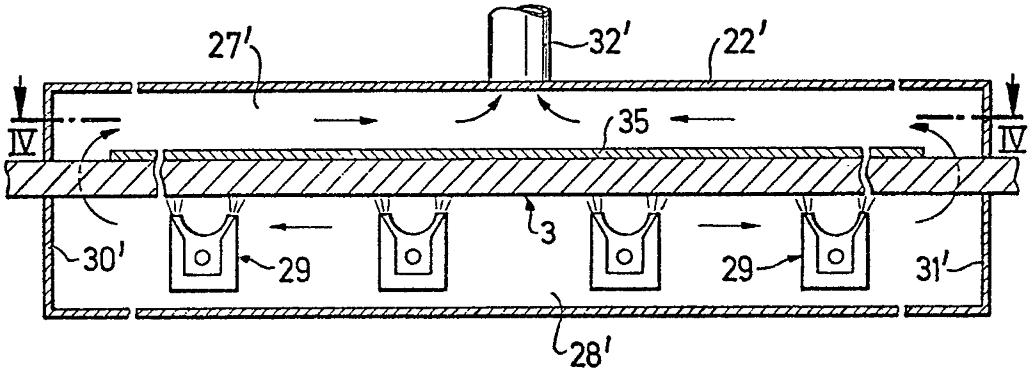
FIG. 3 is a cross-section along the line III—III of FIG. 1.

As can be seen from FIG. 1 the endless steel band 8 can also be passed through this chamber. If the band 8 passes through chamber 23, the partition 26 would be formed or replaced by the steel band 8 and steel band 8 would be arranged and sealed in a manner similar to the manner as shown in FIG. 3 for the casing and burners associated with the upper run of the upper plate chain 3.

Casing 23' is substantially longer than the combined width of the four gas burners 29, as is shown by separating lines in FIG. 2. Partition 26 therefore extends to positions close to the ends 30 and 31 of casing 23 so that the superimposed chambers 27 and 28 are only interconnected or intercommunicated with one another in the area of the ends 30 and 31 of the casing. The width of the partition corresponds to the space between the two side walls of the casing so that the side edges of the partition are tightly connected with the side walls of the casing.

The waste or exhaust gases produced by the flames of the burners 29 are sucked off via a pipe 32 and part of the waste gases are removed in the direction of arrows 33 and another portion in the direction of arrows 34. As a result the underside of plate chain 4 is heated by the exhaust gases also outside the areas where the flames of gas burners 29 act directly on the plate chain.

Figure 4:
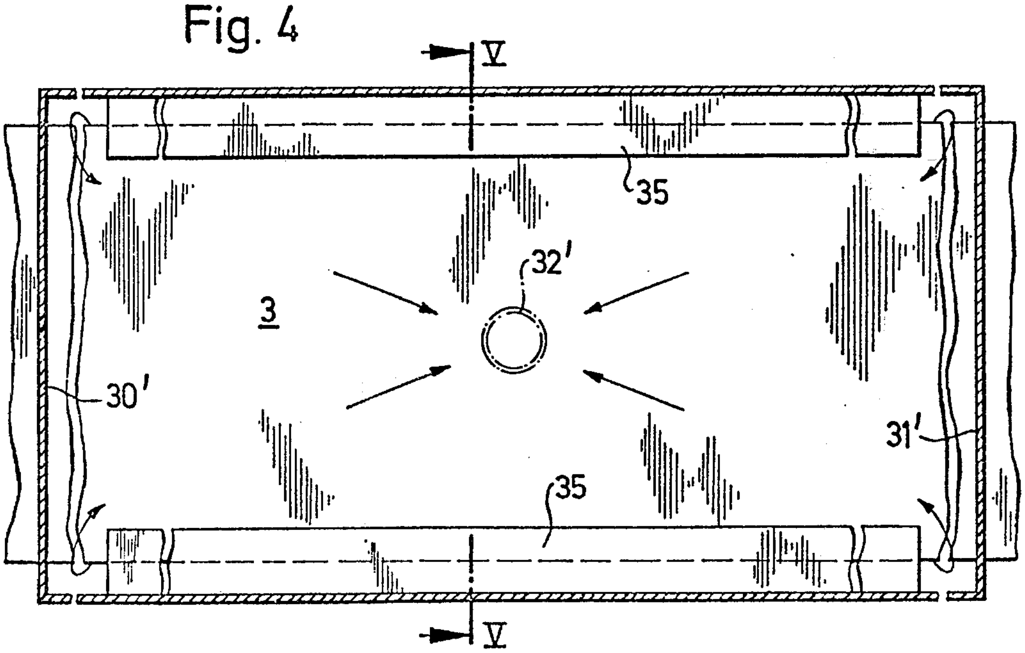
FIG. 4 is a plan view along the line IV—IV of the casing according to FIG. 3.
Figure 5:
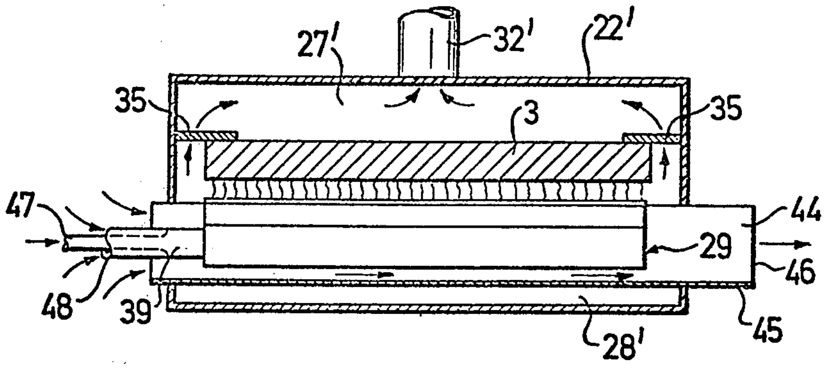
FIG. 5 is a cross-section along the line V—V of FIG. 4.
Figure 6:
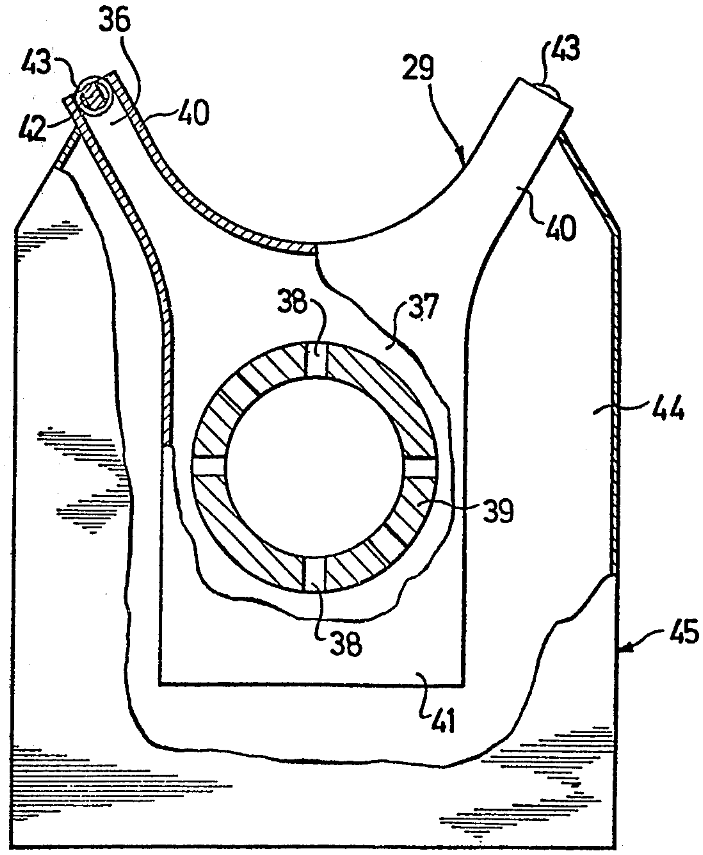
FIG. 6 is an enlarged partial sectional view of a burner utilized in the present invention.

Casing 22' (FIG. 3) also has gas burners 29 which are also arranged in such a way that their flames act on the underside of the upper run of the upper plate chain 3. In this case casing 22' in the same way as casing 22 envelops a portion of the plate chain 3. Since in this case, plate chain 3 is provided in the form of a partition which via sealing means 35 is sealed relative to the side walls of casing 22′ the exhaust gases produced by the burners 29 are partially removed by suction in proximity to one end wall 30′ and partially in proximity to the other end wall 31′ from the lower chamber 28′ into the upper chamber 27′ and from there via a suction pipe 32′ which is located in immediate proximity of the upper side of casing 22′. This can be seen in FIG. 4. What has been stated above relative to the length of casing 23 also applies for casing 22′ and the other casings. Therefore in each case the heat of the waste gases is used for heating the plate chain and optionally also for heating a steel band. The design of the gas burners will be explained hereinafter relative to FIGS. 5 and 6. In casing 22′ plate chain 3 is arranged spaced from all the walls of the casing. Plate chain 3 subdivides with sealing or covering means 35 the inner area of the casing into upper chamber 27′ and lower chamber 28′. In the lower chamber are arranged the gas burners 29.

Each of the gas burners 29 comprise chambers 37 provided with slots 36 wherein is arranged a feed pipe 39 for the gas — air mixture having a plurality of openings 38. The slots 36 are designed in such a way that in each of the hollow members 40 of chamber casing 41 is provided a rectangular bar 42 which is fixed in the hollow members via a wire 43 which envelops the bar in a spiral manner so that between bar and spiral coils of wire 43 slots 36 are formed. It is preferred that the chamber casing 41 and therefore each gas burner is surrounded as completely as possible by a cooling jacket 44 which is in the present case formed by a type of box 45. Cooling air is passed through the box for example by suction at 46. Gas is supplied via a pipe 47 and air via a pipe 48 to feed pipe 39.

Figure 7:
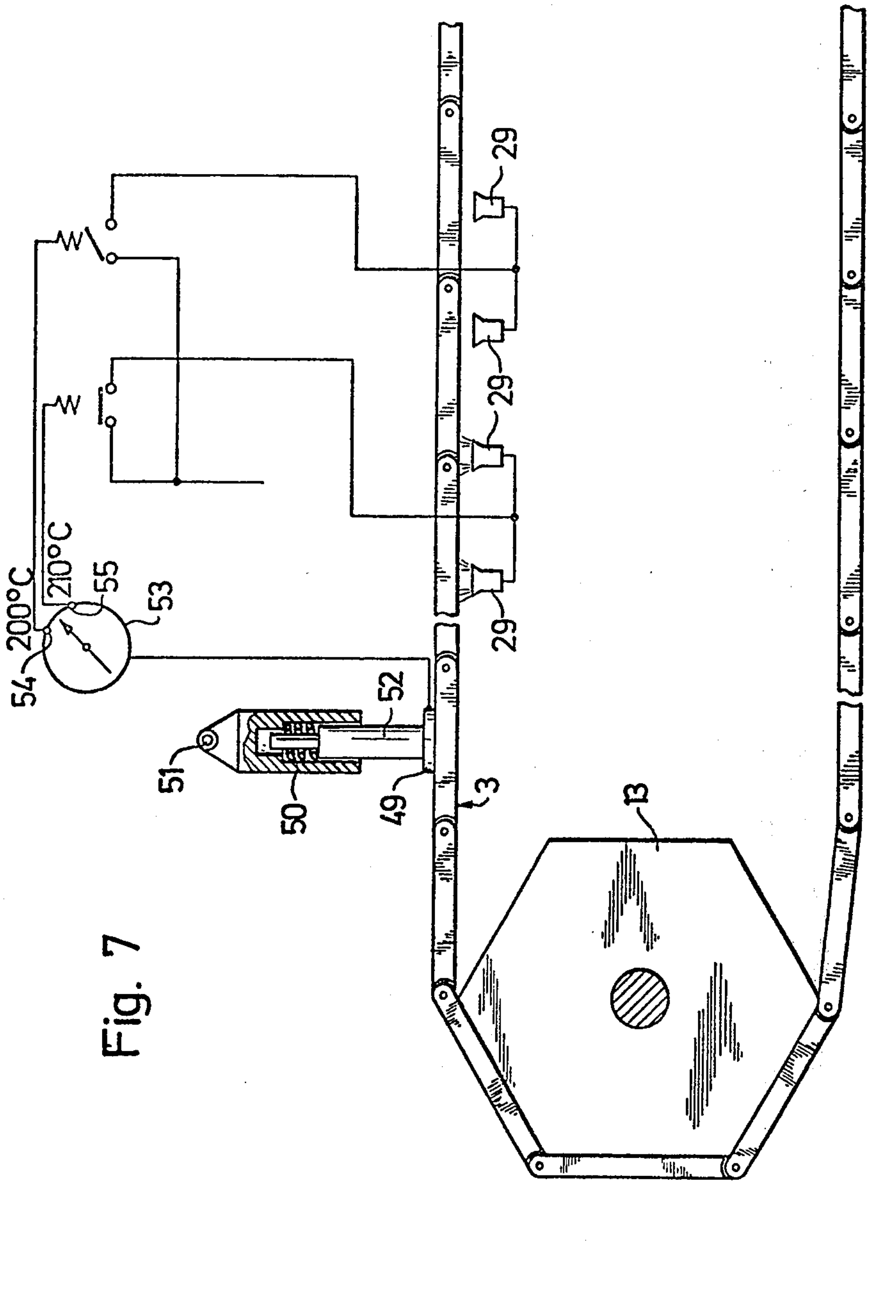
FIG. 7 is a side view schematically illustrating the temperature measuring and gas burner switching device in accordance with the present invention.

Reference is made to FIG. 7 to show how the gas burners 29 are switched on and off. On the top of plate chain 3 is placed a contact plate 49 provided with a temperature sensor which is therefore located behind the outlet point of the casing containing the respective burners 29 (said casing not being shown in FIG. 7). The plate 49 is guided in the vertical direction under the action of a spring 50 and is pivotally mounted about a horizontal shaft 51. The contact plate 49 therefore always rests on a plate of chain 3 even if one plate of the plate chain 3 is inclined. It is preferred to arrange two guide means 52 parallel to one another which guide contact plate 49 and are jointly pivotable about shaft 51. The temperature determined by the temperature sensor is operatively transferred to a measuring and indicating device 53 which is provided with at least two contacts 54 and 55 which are open or closed if temperature rises or falls relative to a predetermined set temperature range. In the preferred arrangement illustrated in FIG. 7, as long as the temperature determined by the thermostat is under the set selectable temperature of for example 200°C all the gas burners 29 provided are switched on and their flames heat the plate chain 3. If, as assumed here, the temperature of 200°C is exceeded then two of the burners 29 are automatically disconnected. If also the temperature of 210°C is exceeded then the other two burners which are still burning are also disconnected. The switching on of the two last disconnected burners is brought about automatically when the temperature drops below 210°C and the two other burners when the temperature drops below 200°C. Thus the temperature of the plate chains can be controlled with relatively simple means.

Figure 8:
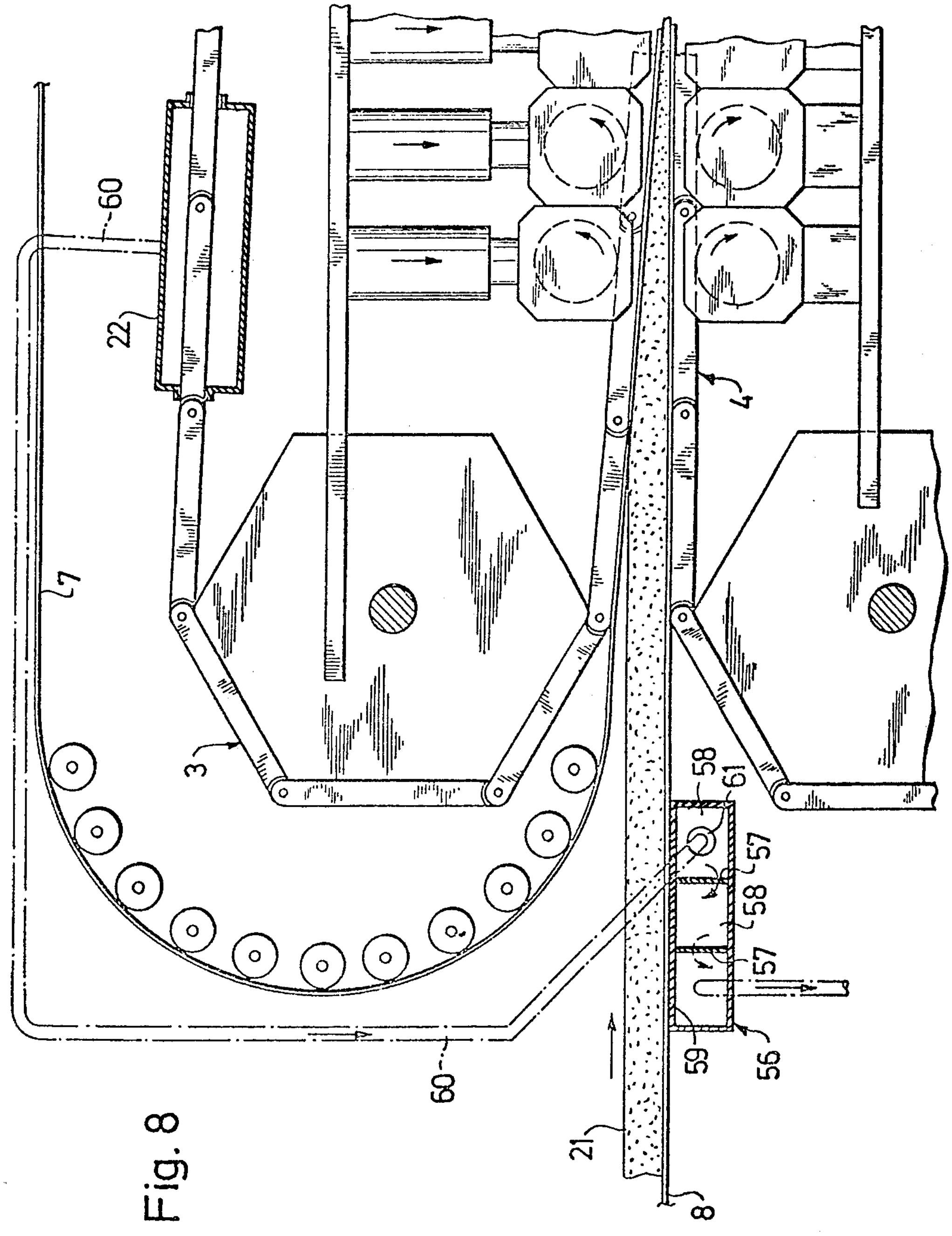
FIG. 8 is a partial enlarged side view illustrating details of the entry zone of the continuously operating press of FIG. 1.
Figure 9:
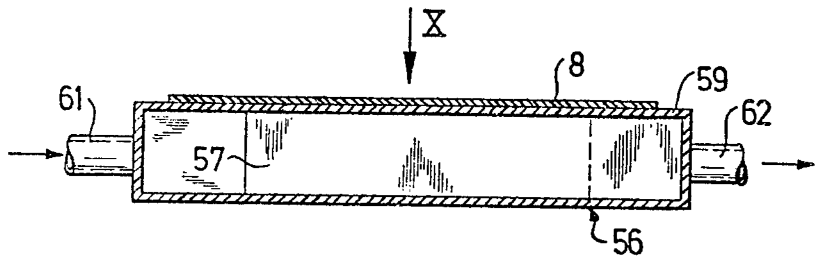
FIG. 9 is a transverse sectional view of a portion of FIG. 8.
Figure 10:
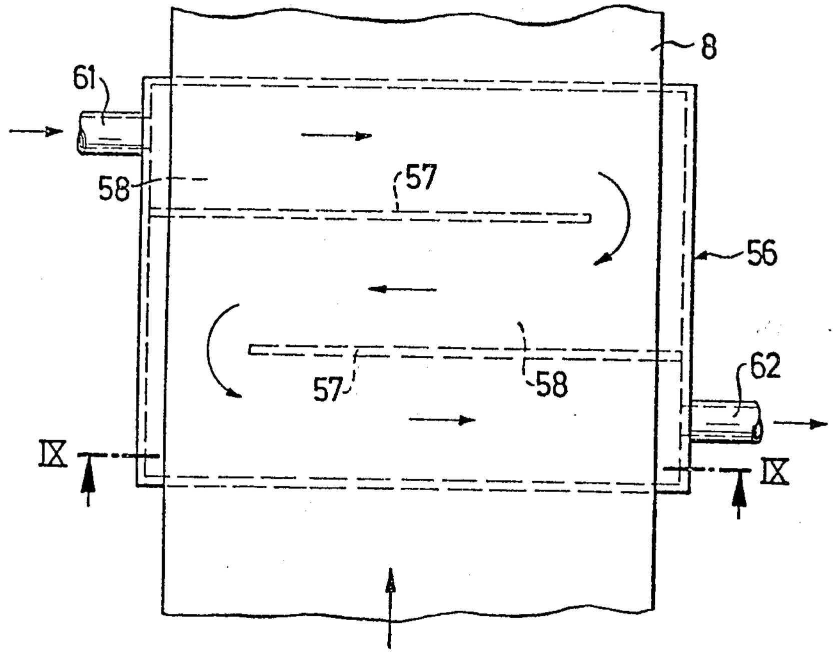
FIG. 10 is a plan view of a portion of the upper run of the lower endless steel band with a housing arranged thereunder cut at the level of the plane fixed by the axes of the waste gas feed and discharge connections.

Heating of one of the endless steel bands is explained relative to FIGS. 8 to 10.

The two endless chain belts 3 and 4 are each enveloped by an endless steel band 7 or 8 whereof the lower endless steel band 8 has a greater length than the upper endless steel band 7 because it serves to supply the chip material sheet 21 to the press. Quite apart from the fact that a longer endless steel band cools more rapidly than a shorter endless steel band it must in certain circumstances be cooled by supplying a cooling agent to prevent a too early setting of the binder supplied to the chip material. However this endless steel band in the working zone of the continuously operating press must be adequately hot to ensure setting in this working zone.

Below the upper run of the endless steel band 8 adjacent to the front deflection point of the endless plate chain 4 a casing or housing 56 is provided wherein by means of partitions 57, channels 58 are provided which form a zig-zag channel path through housing 56. Exhaust gases conducted from casing 22 to the housing 56 heat the steel band 8 by way of covering wall 59 of housing 56 to the necessary temperature.

The exhaust gases emerging from casing 22 are supplied via a waste gas pipe 60 and a supply connection 61 to the part chamber of the casing 56 which is closest to the endless chain belt 4. These exhaust gases pass initially into a part chamber transverse to the direction of movement of the endless steel band 8 (see FIG. 10) and are then passed through the other part chambers in parallel directions and led away via waste gas connections 62. Although in the embodiment shown only three channels 58 are provided it is also possible to have more than three channels.

It is preferred to connect the waste gas pipe 60 to the casing 22 which is closest to the front deflection point of the upper endless chain belt 3 because the gases leaving this casing are hottest. In similar manner the upper endless steel band 7 can be heated. Depending on the point at which the upper endless steel band 7 is heated exhaust gases for many flame burner casings are supplied to the zig-zag channel housing for steel band 7 whose temperatures ensure the necessary heating. Both endless steel bands 7 and 8 should preferably be heated substantially to the same temperature.

It will be understood that the invention could be practiced with more than two burner containing casings for each chain 3 and 4. Also, it will be understood that differing numbers of and differing positioning of the exhaust gas heater housing 56 for the steel bands could be utilized with corresponding different conduit connections to various of the burner casings.

While I have shown and described only several preferred embodiments in accordance with the present invention, it is to be understood that the same is not limited thereto but is susceptible of numerous changes and modifications as would be known to those skilled in the art given the present disclosure, and I therefore do not wish to be limited to the details shown and described herein only schematically but intend to cover all such changes and modifications.

I claim:

1. A press for producing boards such as chipboards, fibreboards, and the like; said press comprising:

a first movable endless belt formed of heatable belt parts, a second movable endless belt formed of heatable belt parts, guiding and moving means for guiding and moving said first and second belts with respective outer surfaces of said belts in facing relationship and moving in the same direction over a material pressing portion of the respective travel paths of said belts such that material forming said boards can be conveyed by and compressed between said belts along said material pressing portion of said respective travel paths, heating means for heating at least one of said first and second belts, said heating means including at least one flame burner directing a heating flame against a portion of at least one of said belts and burner exhaust gas conducting means for directing exhaust gases from said at least one flame burner against portions of at least one of said belts which are spaced from said portion being directly heated by said heating flame, and temperature control means for controlling said burners as a function of the temperature of the associated belt.

2. A press according to claim 1, further comprising a first movable flexible band enclosing a portion of and movable with said first belt and a second movable flexible band enclosing a portion of and movable with said second belt, wherein said first and second bands are interposed between said belts over said material pressing portion of the respective travel paths thereof to directly engage said material during pressing operations.

3. A press according to claim 2, wherein said first belt is an upper belt, the respective material pressing portion of the travel path of said first belt corresponding to a lower run of said first belt, the travel path of said first belt including an upper run extending above and in the opposite direction of said lower run, wherein said second belt is a lower belt, the respective material pressing portion of the travel path of said second belt corresponding to an upper run of said second belt, the travel path of said second belt including a lower run extending below and in the opposite direction of said upper run of said second belt, and wherein said heating means includes respective flame burners directing heating flames against a part of the upper run of said upper belt and against a part of the lower run of said lower belt.

4. A press according to claim 3, wherein the respective heatable belt parts of each of said belts are relatively rigid heatable plate members that are articulated to one another to form said belts, and wherein said guiding and moving means include a pair of horizontal and parallel shafts spaced from one another for each belt, said belts being movably guided around respective reversing pulleys rotatable about respective axes of said shafts.

5. A press according to claim 4, wherein said heating means includes at least one relatively fixed burner casing positioned adjacent each of said upper run of said upper belt and said lower run of said lower belt, each of said casings containing a plurality of said flame burners and a suction pipe forming part of said burner exhaust gas conducting means.

6. A press according to claim 5, wherein said temperature control means includes a limit value circuit associated with a measuring device for controlling switching on and off respective ones of the burners.

7. A press according to claim 5, wherein said temperature control means for the burners is at least one of said casing includes: a contact plate engageable with a belt at a position downstream of said casing with respect to movement of said belt with respect to said casing, at least one temperature sensor in said contact plate, and a burner control device responsive to said at least one temperature sensor for shutting off a portion of said burners in said casing in response to temperatures in said contact plate in excess of a first predetermined temperature and for shutting off all of said burners in said casing in response to temperatures in said contact plate in excess of a second predetermined temperature which is higher than said first predetermined temperature.

8. A press according to claim 7, wherein said burner control device includes means for starting up said burners in response to temperatures in said contact plate below said respective first and second predetermined temperatures.

9. A press according to claim 8, wherein said contact plate is pivotably mounted about a horizontal shaft and displaceably guided perpendicular to the plane of the contact plate.

10. A press according to claim 1, wherein said temperature control means includes a limit value circuit associated with a measuring device for controlling switching on and off respective ones of the burners.

11. A press according to claim 1, wherein said temperature control means for the burners in at least one of said casing includes: a contact plate engageable with a belt at a position downstream of said casing with respect to movement of said belt with respect to said casing, at least one temperature sensor in said contact plate, and a burner control device responsive to said at least one temperature sensor for shutting off a portion of said burners in said casing in response to temperatures in said contact plate in excess of a first predetermined temperature and for shutting off all of said burners in said casing in response to said contact plate in excess of a second predetermined temperature which is higher than said first predetermined temperature.

12. A press according to claim 11, wherein said burner control device includes means for starting up said burners in response to temperatures in said contact plate below said respective first and second predetermined temperatures.

13. A press according to claim 12, wherein said contact plate is pivotably mounted about a horizontal shaft and displaceably guided perpendicular to the plane of the contact plate.

* * * * *